June 15, 1943.    O. S. CARLISS    2,321,652
PORTABLE FORCE MEASURING APPARATUS
Filed March 12, 1940    3 Sheets-Sheet 1
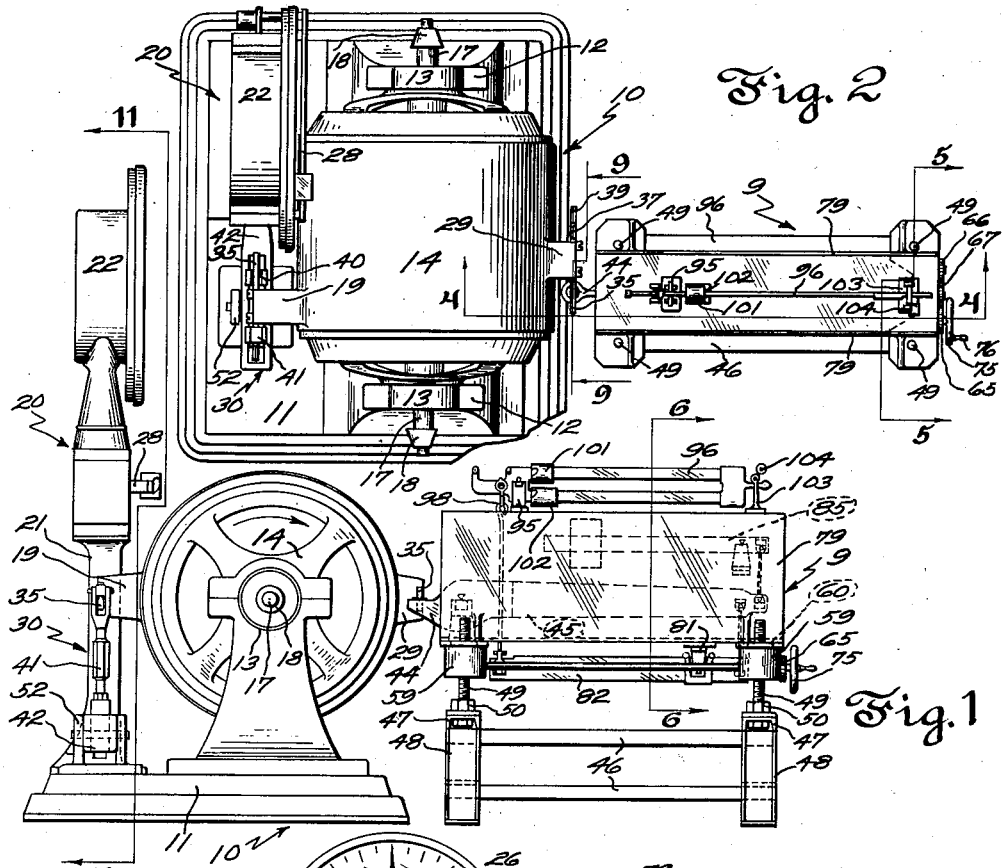
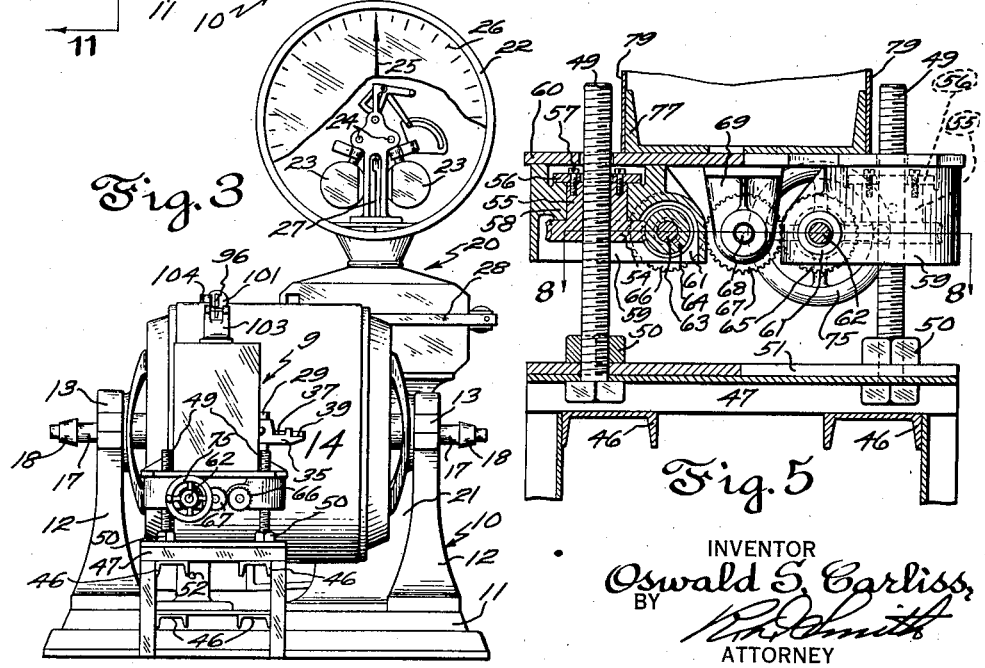
INVENTOR
Oswald S. Carliss,
BY
ATTORNEY June 15, 1943.   O. S. CARLISS   2,321,652
PORTABLE FORCE MEASURING APPARATUS
Filed March 12, 1940   3 Sheets-Sheet 2
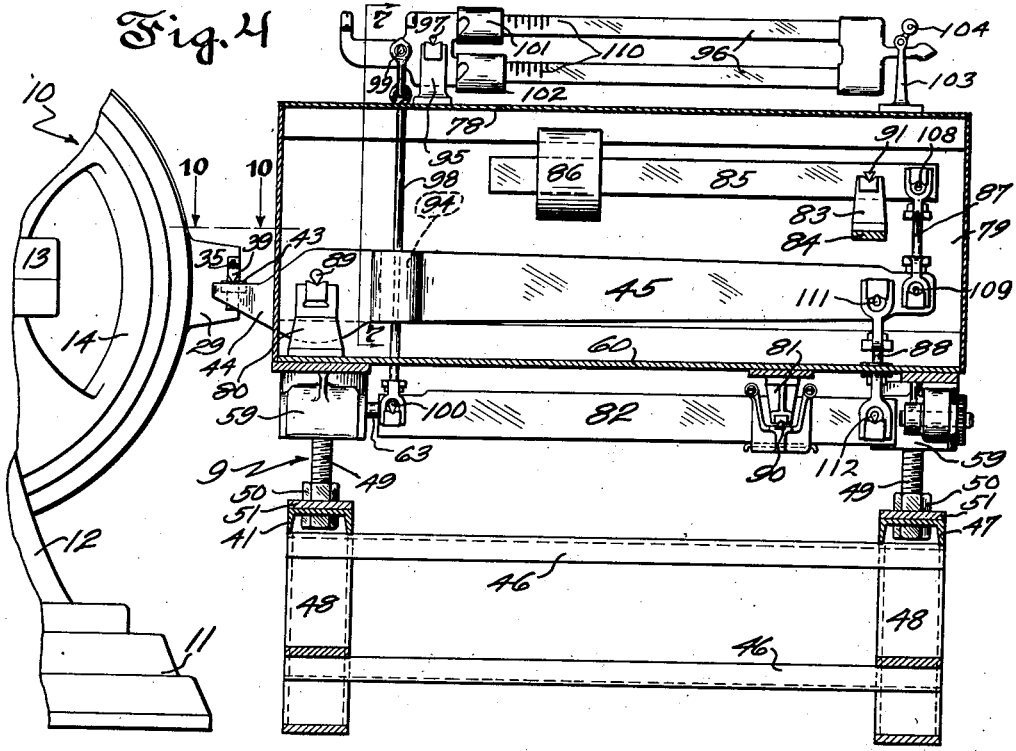
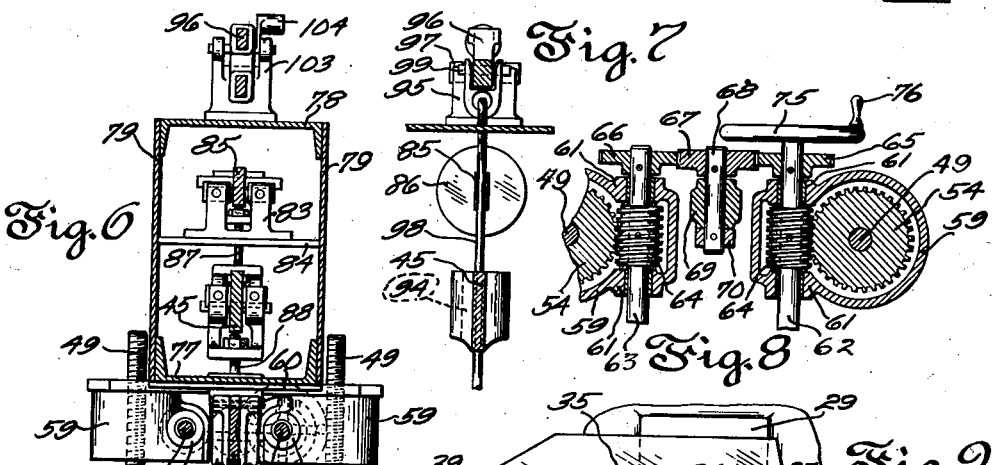
INVENTOR
Oswald S. Carliss
BY
ATTORNEY June 15, 1943. O. S. CARLISS 2,321,652
PORTABLE FORCE MEASURING APPARATUS
Filed March 12, 1940 3 Sheets-Sheet 3
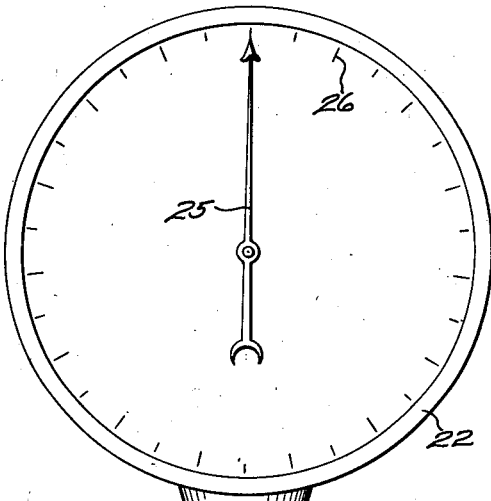
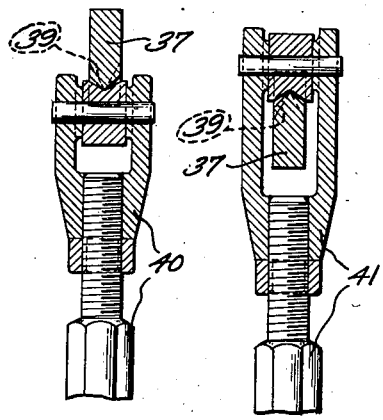
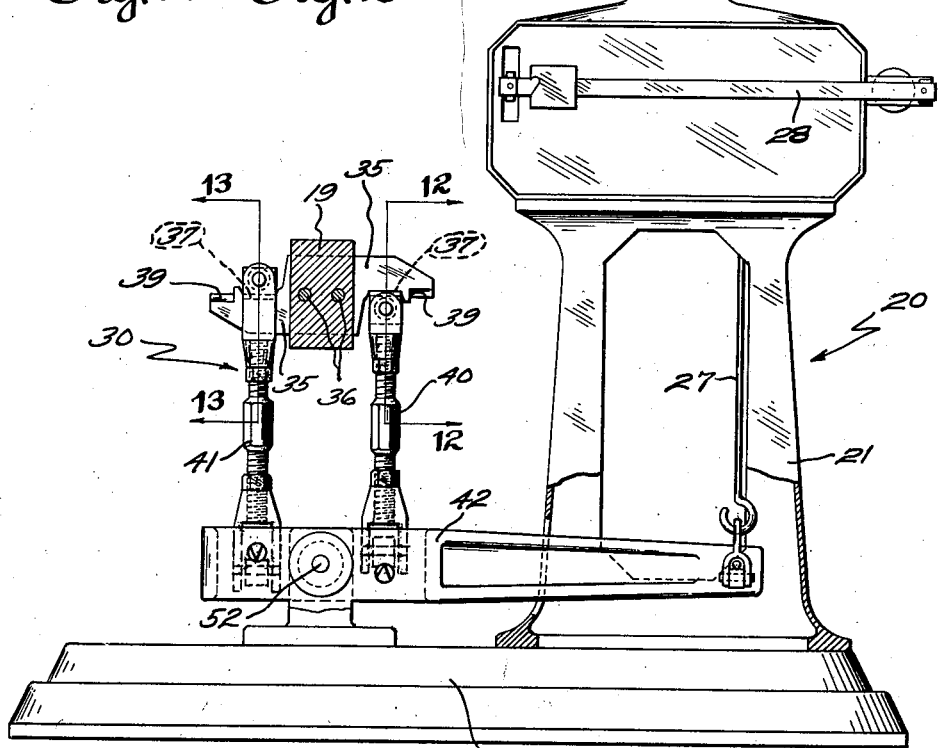
Fig. 12  Fig. 13
Fig. 11
INVENTOR
Oswald S. Carliss
BY
ATTORNEY Patented June 15, 1943

2,321,652

UNITED STATES PATENT OFFICE 2,321,652

PORTABLE FORCE MEASURING APPARATUS

Oswald S. Carliss, Fairfield, Conn., assignor to The Kron Company, Bridgeport, Conn., a corporation of Connecticut Application March 12, 1940, Serial No. 323,569

12 Claims. (Cl. 265—24)

This invention relates to testing apparatus of unitary and portable nature particularly suited to being transported into proximity to a fixedly stationed dynamometer including its force indicating instrument, and thereupon positioned and disposed to receive the thrust of some movable part of such dynamometer or instrument in a manner to measure and partly counterbalance such thrust while the dynamometer is indicating or registering the torque exerted by a prime mover while its work out-put is being measured or at other times.

Dynamometers are conventional in which there are operatively coupled together an absorption type of dynamo-electric machine and a weighing scale acting to counterbalance and indicate the magnitude of the torque set up in and by such machine. Weighing scales which employ automatic load counterbalancing and indicating mechanism, such as of the pendulum weighted type, are commonly used in this connection because of their well understood ability to cause an indicating pointer to shift its position automatically over a scale of graduations in accurate accord with variations in the load or torque force transmitted to the pendulums from the dynamoelectric machine.

In practical operations there becomes needed at times a means of checking or testing the accuracy of the dynamometer indicator reading by the use of standard weight applying devices. Since possible sources of error may reside in the action of the dynamo-electric machine, itself, all of the errors which may possibly be present can best be detected by applying the weighting devices to some part of the dynamo-electric machine. The common method of applying such weighting devices for test comparison has heretofore consisted in carrying impractically heavy standard weight bodies to the vicinity of the dynamometer and then lifting such heavy bodies and hanging them onto some dynamometer force transmitting linkage at a point which is responsive to the torque force exerted upon the dynamo-electric machine or its automatic weighing scale mechanism.

The present improvements in unitary testing apparatus eliminate all necessity for this formerly cumbersome and difficult procedure, and provide a readily transportable testing unit equipped with sufficient means for positional adjustment to enable it to present to a suitable movable element or elements on the dynamometer a force receptive arm movable in unison with a poise-weighted beam. By this expedient a portion of the whole force ordinarily transmitted by the dynamometer to the weighing scale may be counterbalanced by such poise-weighted beam and thus there can accurately be made known and compared with the reading of the dynamometer scale the true magnitude of torque to which the dynamometer is subjected by the engine or other form of prime mover whose work output is being measured.

The foregoing and other advantages of these improvements will become clearer from the following description of a preferred embodiment thereof in which description reference is had to the accompanying drawings wherein:

Fig. 1 is a view of a unitary testing apparatus embodying and included in the present improvements standing in cooperative relationship to a dynamometer, the accuracy of whose indicator readings is to be tested by said unitary apparatus.

Fig. 2 is a plan view of the combined dynamometer and testing apparatus shown in Fig. 1.

Fig. 3 is a view looking from the right at Fig. 1.

Fig. 4 is a view drawn on an enlarged scale showing parts of the frame and mechanism of the testing unit taken in section on the plane 4—4 in Fig. 2, looking in the direction of the arrows.

Fig. 5 is a correspondingly enlarged fragmentary view of the lower portion of the testing unit taken in section on the planes 5—5—5 in Fig. 2, looking in the direction of the arrows.

Fig. 6 is a view drawn on the same scale as Fig. 4 taken in section on the plane 6—6 in Fig. 1, looking in the direction of the arrows.

Fig. 7 is a fragmentary view drawn on the same scale as Fig. 4 taken in section on the plane 7—7 in the latter figure looking in the direction of the arrows.

Fig. 8 is a fragmentary view drawn on the same scale as Figure 5 taken in section on the plane 8—8 in the latter figure, looking in the direction of the arrows.

Fig. 9 is an enlarged view of the end of the dynamometer arm showing associated parts of the tester in section on plane 9—9 in Fig. 2.

Fig. 10 shows on an enlarged scale a plan view of the projecting, thrust receptive arm of the main lever of the testing unit in its relation to the dynamometer arm as viewed from the plane 10—10 in Fig. 4.

Fig. 11 is an enlarged view of the force measuring instrument of the dynamometer as viewed from the section plane 11—11 in Fig. 1, with the nearer wall of its column broken away.

Fig. 12 is a still further enlarged fragmentary view taken in section on the plane 12—12 in Fig. 11 looking in the direction of the arrows.

Fig. 13 is a similar fragmentary view taken in section on the plane 13—13 in Fig. 11 looking in the direction of the arrows.

Whereas the improvements comprising the present invention reside in the structure of the unitary testing apparatus 9, itself, they embrace also the combination of the testing unit with a dynamometer inclusive of its force counterbalancing and indicating instrument whose readings are to be tested. Hence there is illustrated in Figs. 1, 2 and 3 a dynamo-electric machine indicated as a whole at 10, such as is conventional with dynamometers of the energy absorption type, whose main working parts include a base or pedestal 11, spaced standards 12 upstanding rigidly therefrom and supporting compound rotary bearings 13 for the slightly rotatable field body 14, within which is pivoted the freely rotatable armature shaft 17, the latter being equipped at either of its ends 18 for readily and detachably coupling it to an engine shaft, or other power shaft, whose work output or torque is to be measured by the dynamometer.

At its left side in Fig. 1 the pivotally mounted field body 14 carries fixed thereto a radially projecting arm 19 which extends into pivotally coupled connection to a force counterbalancing and indicating instrument indicated as a whole at 20. This instrument which may be of the weighing scale type comprises a framework inclusive of the column 21 which stands secured to the same base 11 with the dynamometer 10. Column 21 supports at its top a housing 22 in which is located a dial head mechanism including load force counterbalancing pendulums 23 whose swinging movements about frame pivots 24 are transmitted into rotary movement of the indicator pointer 25 so that the latter sweeps over a scale of force indicating graduations 26 best shown in Figs. 3 and 11. It will be unnecessary to describe further details of the dial head pendulum mechanism as a sufficient example thereof is fully illustrated and described in U. S. Patent No. 2,103,413 granted to G. E. Weist. Somewhat special lever and linkage devices indicated as a whole by 30 are provided for coupling the dynamometer arm 19 to the draft rod 27 running to the dial head mechanism so that the tendency of this arm to move either upward or downward in Fig. 1 will result in downward pull on draft rod 27. As is conventional in weighing scale mechanism a poise weighted tare beam 28 may be provided whose construction, connections and method of operation may be as shown in U. S. Patent No. 2,250,294 granted to O. S. Carliss.

On the opposite side of the dynamo-electric machine from arm 19, the dynamometer field body 14 carries a similar radially projecting arm 29 fixed thereto. As best shown in Fig. 9, each of arms 19 and 29 may be equipped with a like knife-edge terminal plate 35 clamped fixedly against its extreme end by bolts 36 having two knife-edge formations at each of its ends. Each inner knife-edge formation 37 is designed to bear on one or the other of the conventional grooved yoke blocks of coupling rods 40 or 41 while each of the outer knife-edge formations 39 is left free so that one of them presents itself in a way to pivotally engage and bear down against a V-grooved cylindrical block 43. This block may be rotatably nested in a round recess in the top surface of a short projecting arm 44 which forms a portion of the main lever 45 of the unitary testing apparatus 9 of the present improvements.

The coupling rods 40 and 41 above referred to are pivotally connected at their bottom ends to the horizontal lever 42 by conventional means at equal distances from the fulcrum bearing 52 of the latter which fulcrum is stationed on the base 11. The right end of lever 42 extends through an aperture in the wall of column 21 in Fig. 11 and is pivotally connected by conventional means to the draft rod 27 which extends upward through the hollow interior of said column to the dial head pendulum mechanism. Thus rod 40 is enabled to transmit to lever 42 a downward thrust received from the field body arm-carried plate 35 while rod 41 can transmit to the same lever 42 an upward pull exerted by plate 35 upon reverse direction rotation of the dynamo-electric machine 10. The said downward thrust and the said upward pull will be transmitted with equal leverages to lever 42 and in each case in a manner to cause counterclockwise rocking of this lever upon its fulcrum 52 in Fig. 11.

The frame of the portable unitary testing apparatus 9 comprises a transportable base and an elevatable frame section carrying weighing mechanism which may be raised and lowered in relation to the base. The latter is skeletonized and may consist of four spaced horizontal channel irons 46 whose ends are connected by cross irons 47, all of said irons being secured rigidly together by welding or other suitable means, together with legs 48 which form supports on which the entire testing unit 9 may be stood and yet permit the insertion of a lift truck or other conveyance under the channel irons 46 for the purpose of picking up the testing unit and conveying it to different dynamometers to be tested thereby.

Secured rigidly at each of the four corners of the base are the upstanding threaded shanks of very rigid bolt posts 49 whose heads may be securely clamped against the bottom surface of cross irons 47 by means of the nuts 50, which nuts also secure against the top surface of the cross irons 47 the reinforcing bars 51.

In threaded engagement with each bolt post 49 there is a worm wheel 54 whose hub portion 55 provides a considerable length of threaded engagement between the post and the worm wheel. A large overhanging thrust washer 56 is secured to the end of each hub 55 by bolts 57. An external bearing is afforded for each hub 55 between worm wheel 54 and washer 56 by the portion 58 of a corner bearing bracket 59. The four bearing brackets 59 are firmly bolted or otherwise secured to a floor plate 60 of the elevatable frame section and support respectively the four corners of the latter. Each bearing bracket 59 is further shaped as best shown in Fig. 8 to provide two spaced and aligned horizontal bearings 61. In the bearings 61 of two of the brackets 59 there is journaled a long front shaft 62. A similar long rear shaft 63 is journaled in the remaining bearings 61 of the other two brackets 59. Each of shafts 62 and 63 carries fixed thereon between bearings 61 two worms 64 respectively near its opposite ends. The four worms 64 are thus held rotatably in mesh with the four worm wheels 54. Shaft 62 also carries fixed thereon a spur gear 65 while shaft 63 carries fixed thereon a like spur gear 66. In mesh with both of gears 65 and 66 is a transmission gear 67 fixed to a stub shaft 68 which is journaled in a bearing bracket 69 fixed to and depending from the floor plate 60. A thrust washer 70 retains stub shaft 68 in its bearing. Outside of gear 65 the shaft 62 carries fixed thereto a hand wheel 75 having the crank handle 76.

The foregoing structure and mechanism enables the operator by turning the single hand wheel 75 to rotate the four worms 64 simultaneously, thereby causing all four worm wheels 54 to turn relative to their respective screw threaded posts 49 which remain stationary. Consequently the floor plate 60 will be raised or lowered equal amounts at each of its four corners as each worm wheel hub 55 turns an equal amount in threaded engagement with its post. The screw threads on posts 49 and the relationship of gears 65, 66, 67 are such that each of the four corners of floor plate 60 are raised or lowered simultaneously and exactly equal amounts so that this plate is always maintained firmly supported in a true horizontal plane.

Above the floor plate 60 there is carried the remaining parts of the elevatable frame section including a bottom channel iron 77 and top channel iron 78 extending lengthwise of the testing unit and connected by side walls 79. The floor plate 60 and the bottom channel 77 combine to support the upright fulcrum bracket 80 on which is pivoted the main lever 45 of the testing apparatus, and also the inverted fulcrum bracket 81 against which rocks the transmission lever 82. A third fulcrum bracket 83 spans the space between side walls 79 and is secured thereto and supported thereby and pivotally supports an auxiliary balance compensating lever 85 weighted by the slidable poise 86. The construction of a linkage 87 with its knife-edge pivotal couplings 108, 109 which serve to connect auxiliary lever 85 to the main lever 45 and of a linkage 88 with its knife-edge pivotal couplings 112, 111 which serve to connect the main lever 45 to the transmission lever 82 may be conventional, as may also be the knife-edge bearings 89 about which main lever 45 rocks on bracket 80, and the knife-edge bearing 90 against which transmission lever 82 bears, and the knife edge bearing 91 by means of which the auxiliary lever 85 is supported on bracket 83.

On the top channel 78 there is mounted a fulcrum bracket 95 for rockably supporting a compound weigh beam 96 by means of a conventional knife-edge bearing 97. The short arm of beam 96 is connected to the left end of transmission lever 82 by a conventional linkage 98, as indicated in Fig. 4, including the conventional knife-edge coupling 99 for beam 96 and the conventional knife-edge coupling 100 for the transmission lever 82. Linkage 98 passes through a hollow portion 94 of the main lever 45. Poises 101 and 102 are independently slidable along the scale bars of weigh beam 96 and the free end of the latter is protected by an index bracket 103 and may be locked by the throw arm 104 to throw the beam out of action. When a load force is applied to the main lever arm 45 of the testing apparatus, a condition of overbalance or underbalance with respect to the setting of poises 101 and 102 on the weigh beam is sensitively indicated as usual by the position and movements of the free end of weigh beam 96 relative to the index bracket 103.

Assuming that the dynamometer shaft 17 is being rotated under the power of an engine whose work output or torque characteristics are to be measured, and that the mechanical energy thus delivered to the dynamometer is absorbed as electrical energy by resistance grids or other electrical apparatus which is conventional for this purpose and hence not shown herein, and that this results in the exertion of an upward thrust by arm 19 of the dynamometric field body 14 and simultaneously results in the exertion of a downward thrust by arm 29 of this same field body, then tests of the accuracy of the reading of the scale pointer 25 by the use of my improved unitary testing apparatus may be made in the following manner.

If the testing unit chances to be at a remote location, it can be picked up by a lift truck owing to the space between the lowest of channel irons 46 and the floor, and thus transported as a unit and maneuvered into such position that the V-grooved bearing block 43 in the main lever 9 projecting arm 44 of the testing unit 9 is just beneath the downwardly disposed knife-edge 39 of terminal plate 35 of the dynamometer arm 29. At this time the upward pull of the other arm 19 of the dynamometer upon the coupling rod 41 of the linkage 30 is acting through lever 42 and draft rod 27 to lift the pendulums 23 and cause pointer 25 to register on graduations 26 an indication of the torque force exerted by the dynamometer field body.

The operator will now perform his test of the accuracy of the dynamometer reading by turning hand wheel 75 of the testing unit in a direction to lift bearing block 43 upward until it supports the downward thrust of dynamometer arm 29 sufficiently to share with pendulums 23, the counterbalancing of the torque exerted by the dynamometer field body 14.

The graduations 110 on the bars of beam 96 may consist of indicia designating magnitudes of weight equal to dead test weights which in former practice were with considerable difficulty and great manual exertion lifted and hung upon the knife edge 37 requiring the dismantlement therefrom of coupling 41. When the apparatus disclosed herein is used to share with pendulums 23 the counterbalancing of the torque of the dynamometer arm, the pointer 25, if subject to no error, will cooperate with some dial graduation 26 so that when true balance is obtained, the reading of the pointer will be reduced to the extent of the participation of the present testing apparatus in sharing the load, namely to the extent of that value of weight which is set off on the graduations 110 of beam 96.

While there is described in the foregoing one manner of using the portable unitary testing apparatus of these improvements by applying it to the opposite side of a dynamo-electric machine from the side thereof where the force counterbalancing and indicating mechanism of the dynamometer is located, it will be understood that the same testing unit 9, with or without modifications thereof, may as readily be brought around and applied to the force transmitting arm 19 of the dynamometer which acts on the linkage 30 operating the pendulum mechanism of the scale 20. This would be done when the dynamo-electric machine rotates counterclockwise in Fig. 1. In this case the downward disposed knife-edge 39 nearest the end of plate 35 on field frame arm 19 will bear downward on the tester lever arm 44 at the same time that the closely adjacent knife-edge 37 of this same plate bears downward on the coupling rod 40. Obviously if the dynamo-electric machine 10 is not running and both of arms 19 and 29 are exerting no torque, the weigh beam 96 with its poises 101, 102 can be made to counterbalance merely the pendulums 23 of the dial scale mechanism under such "no load" condition of the dynamometer and this is equally true whether the tester arm 44 acts on torque arm 19 or on torque arm 29. The terminal plates 35 on arms 19 and 29 may be interchanged by removing their holding bolts 36. Each of the plates is likewise shiftable end for end so there are, among the four knife edges 39 on the two plates 35, three distinct knife-edges which may be substituted for any one of the said four edges which might become objectionably dull through wear.

Other modifications may be resorted to both in manner of use and in the construction of the parts and yet avail of the principles underlying this invention. Therefore the following claims will be understood as directed to and intended to cover all equivalents and substitutes which would be suggested to those skilled in this art by the disclosure hereof.

I claim:

1. In a portable manipulative force measuring apparatus for checking the indicating reading of a force measuring and indicating instrument associated with the torque arm of a dynamometer, the combination of, a frame including a movable base to facilitate moving said frame into variable juxtapositional relationship to said arm and an elevatable frame section carried by said base, weighing mechanism carried by said frame section including a thrust receptive member constructed and arranged to cooperate with said arm, and devices supported by said base and operatively engaging with said frame section constructed and arranged to establish the latter at variable heights relative to the former thereby to place said member at a selected level in relation to said arm.

2. In a portable manipulative force measuring apparatus for checking the indicating reading of an automatic force measuring and indicating instrument operatively associated with a dynamometer having a force transmitting arm, the combination of, a frame including a movable base to facilitate moving said frame into variable juxtapositional relationship to said arm and an elevatable frame section carried by said base, weighing mechanism carried by said frame section including a thrust receptive member projecting well outward from said mechanism so that said member may cooperate with said arm to receive therefrom a downward directed weighable load force, and devices supported by said base and operatively engaging with said frame section constructed and arranged to establish the latter at variable heights relative to the former thereby to place said member at a selected level in relation to said arm.

3. In a portable force measuring apparatus for checking the indicating reading of a torque measuring and indicating instrument operatively associated with a dynamometer in a manner to counterbalance the force exerted by at least one torque arm of said dynamometer, the combination of, a frame for said apparatus structurally independent of said instrument and dynamometer and arched to receive beneath it a wheeled vehicle for transporting said apparatus to and away from said dynamometer, a thrust receptive member pivotally mounted on said frame and projecting laterally therefrom far enough to occupy the path of rotary movement of said torque arm thereby to obstruct the latter and assist said scale in counterbalancing the force exerted by said torque arm, and means to weight said member selectively including an adjustable poise.

4. In a portable force measuring apparatus for checking the indicating reading of an automatic measuring and indicating instrument operatively associated with a dynamometer having a force transmitting arm, the combination of, a frame having a base including legs supporting the same at a sufficient height to admit beneath said base the platform of a lift truck or other conveyance for picking up and carrying said frame into variable juxtapositional relationship to said arm and a frame section carried by said base, weighing mechanism carried by said frame section including a thrust receptive member projecting well outward from said mechanism so that said member may cooperate with said arm to receive therefrom a downward directed weighable load force, and devices supported by said base and operatively engaging with said frame section constructed and arranged to establish the latter at variable heights relative to the former thereby to place said member at a selected level in relation to said arm.

5. In a portable force measuring apparatus for checking the indicating reading of a torque measuring and indicating instrument operatively associated with a dynamometer having a force transmitting device pivotally mounted for swinging movement past the level of its pivotal axis, the combination of, a transportable base structurally independent of said dynamometer and adapted to be moved bodily to and from proximity thereto, an elevatable frame section carried by said base, a plurality of interlinked levers respectively rockable on a plurality of fulcrums on said frame section, one of said levers projecting laterally from said frame section sufficiently to reach into the path of said swinging movement of said force transmitting device when said base is appropriately maneuvered and placed in relation to said dynamometer, a plurality of horizontally spaced lifting and lowering instrumentalities supported by said base and engaging with said frame section constructed and arranged to elevate the latter with respect to the former in a manner to prevent tilting of said frame section relative to said base thereby to cause said lever to meet said force transmitting device on the said level without disturbing the relative heights of said fulcrums, and manipulative counterbalancing and measuring devices carried by said frame section operatively connected through said interlinked levers to said projecting lever for biasing the same to a known degree indicated by said devices for test comparison with the force indictaing reading of said measuring and indicating instrument.

6. In a portable force measuring apparatus for checking the indicating reading of a torque measuring and indicating instrument operatively associated with a dynamometer having a torque arm, the combination of, a frame including a movable base to facilitate moving said frame into variable juxtapositional relationship to said torque arm and an elevatable frame section carried by said base, fulcrums mounted on said frame section, a system of load weighing levers pivotally mounted on said fulcrums respectively including a thrust receptive member projecting well outward from said frame section thereby to reach into a position to cooperate with said torque arm in a manner to assist in counterbalancing measurable force exerted downward by said arm, and horizontally spaced lifting devices supported by said base and operatively engaging with said frame section constructed and arranged to act cooperatively to maintain and on occasion to vary the elevation of said frame section relative to said base without tilting the former thereby to raise or lower said fulcrums to identical extents relative to the dynamometer while preserving a constant relationship of the respective levels of said fulcrums.

7. In a portable force measuring apparatus for checking the indicating reading of a torque measuring and indicating instrument operatively associated with a dynamometer having a torque arm, the combination of, a frame including a movable base to facilitate moving said frame into variable juxtapositional relationship to said torque arm and an elevatable frame section carried by said base, a plurality of spaced fulcrums carried by said frame section, a poise weighted beam rockably mounted on one of said fulcrums, a main lever rockably mounted on another of said fulcrums operatively coupled to said beam and having a thrust receptive end projecting well outward from said mechanism to reach into a position to cooperate with said torque arm and adapted to counterbalance at least in part a weighably load force exerted downward by said arm, and devices supported by said base and operatively engaging with said frame section constructed and arranged to establish the latter at variable heights relative to the former thereby to place said thrust receptive end of said main lever at a selected level in relation to said torque arm.

8. In a portable force measuring apparatus for checking the indicating reading of various torque measuring and indicating instruments operatively associated respectively with dynamometers having torque arms swingable respectively about axes located at arbitrary height levels, the combination of, a frame including a movable base to facilitate moving said frame into variable juxtapositional relationship to the torque arm of a selected dynamometer and an elevatable frame section carried by said base, weighing mechanism carried by said frame section including a thrust receptive member projecting well outward from said mechanism into a position to cooperate with the torque arm of any of said dynamometers and adapted to counterbalance at least in part a weighable load force exerted downward by said arm, and a plurality of horizontally spaced screw-threaded devices supported by said base and operatively engaging with said frame section constructed and arranged to establish said frame section at finely adjustable heights relative to said base thereby to establish said member at selective heights in exact coincidence with differing arbitrary height levels of the axes of said torque arms.

9. In a portable force measuring apparatus for checking the indicating reading of a torque measuring and indicating instrument operatively associated with a dynamometer having a torque arm, the combination of, a frame including a movable base to facilitate moving said frame into variable juxtapositional relationship to said torque arm and an elevatable frame section carried by said base, a plurality of spaced fulcrums carried by said frame section, a poise weighted beam rockably mounted on one of said fulcrums, a main lever rockably mounted on another of said fulcrums having a thrust receptive end projecting outward away from said frame section to reach into a position to cooperate with said torque arm and adapted to counterbalance at least in part a weighable load force exerted downward by said arm, an intermediate lever operatively coupled both to said beam and to said main lever and rockably supported by a different one of said fulcrums, and horizontally spaced lifting devices supported by said base and operatively engaging with said frame section constructed and arranged to act cooperatively to maintain and on occasion to vary the elevation of said frame section relative to said frame without tilting the former thereby to raise or lower said fulcrums identical extents and preserve a constant relationship of their respective levels.

10. The combination with an automatic force counterbalancing and weight indicating mechanism, of a permanently stationed framework supporting said mechanism, a manipulative force counterbalancing and weight measuring apparatus, a frame carrying said apparatus constructed and arranged to be separable as a unit from the framework of said mechanism, the torque arm of a permanently stationed dynamometer biased downward to exert a measurable force, downward directed knife edges fixed on said torque arm and aligned horizontally end-to-end, an upward facing force-resistive seat included in said mechanism and permanently engaged by one of said knife edges, and another upward facing force-resistive seat alongside the first said seat incorporated in said apparatus and presented thereby in the path of movement of the other of said knife edges, whereby said apparatus on occasion is enabled to share with said mechanism the thrust of said torque arm.

11. In a portable force measuring apparatus for checking the indicating reading of a torque measuring and indicating instrument operatively associated with a dynamometer having a torque arm, the combination defined in claim 7, together with a downward directed knife edge carried by said torque arm, and a seat carried on the top of the said thrust receptive end of the said main lever having a groove extending parallelly with the pivotal axis of rocking movement of the latter and positionable in relation to said dynamometer to receive said knife edge in said groove.

12. In a portable manipulative apparatus for applying predeterminate selective test loads to an automatic force measuring and weight indicating instrument mechanically associated with the torque arm of a dynamometer, the combination of, a frame including a movable base to facilitate moving said frame into variable juxtapositional relationship to said arm and an elevatable section of said frame carried by said base, testing apparatus including a poise equipped system of weighing levers carried by said frame section including a thrust exerting member constructed and arranged to cooperate with said arm in a manner to exert upward thereon a test force consisting of the counterbalancing load of said weighing levers thereby applied to said instrument, and devices supported by said base and operatively engaging with said frame section constructed and arranged to lift the latter in minute stages and to establish said section together with its said carried system of weighing levers at variable heights relative to said torque arm whereby said member and said arm may be lifted into and held in selective levels for loading said weighing instrument and testing the accuracy of its load weight indication.

OSWALD S. CARLISS.

CERTIFICATE OF CORRECTION.

Patent No. 2,321,652.　　　　　　　　　　　　　　　　　　　　　June 15, 1943.

OSWALD S. CARLISS.

It is hereby certified that error appears in the printed specification of the above numbered patent requiring correction as follows: Page 1, first column, line 8, for "counterbalanced" read --counterbalance--; page 4, second column, line 5, claim 4, for "having a base including legs" read --including a base having legs--; line 54, claim 5, for "indictaing" read --indicating--; and that the said Letters Patent should be read with this correction therein that the same may conform to the record of the case in the Patent Office.

Signed and sealed this 3rd day of August, A. D. 1943.

(Seal)

Henry Van Arsdale,
Acting Commissioner of Patents.